P. H. VANDER WEYDE.
Improvement in the Manufacture of Illuminating Gas.
No. 125,633. Patented April 9, 1872.
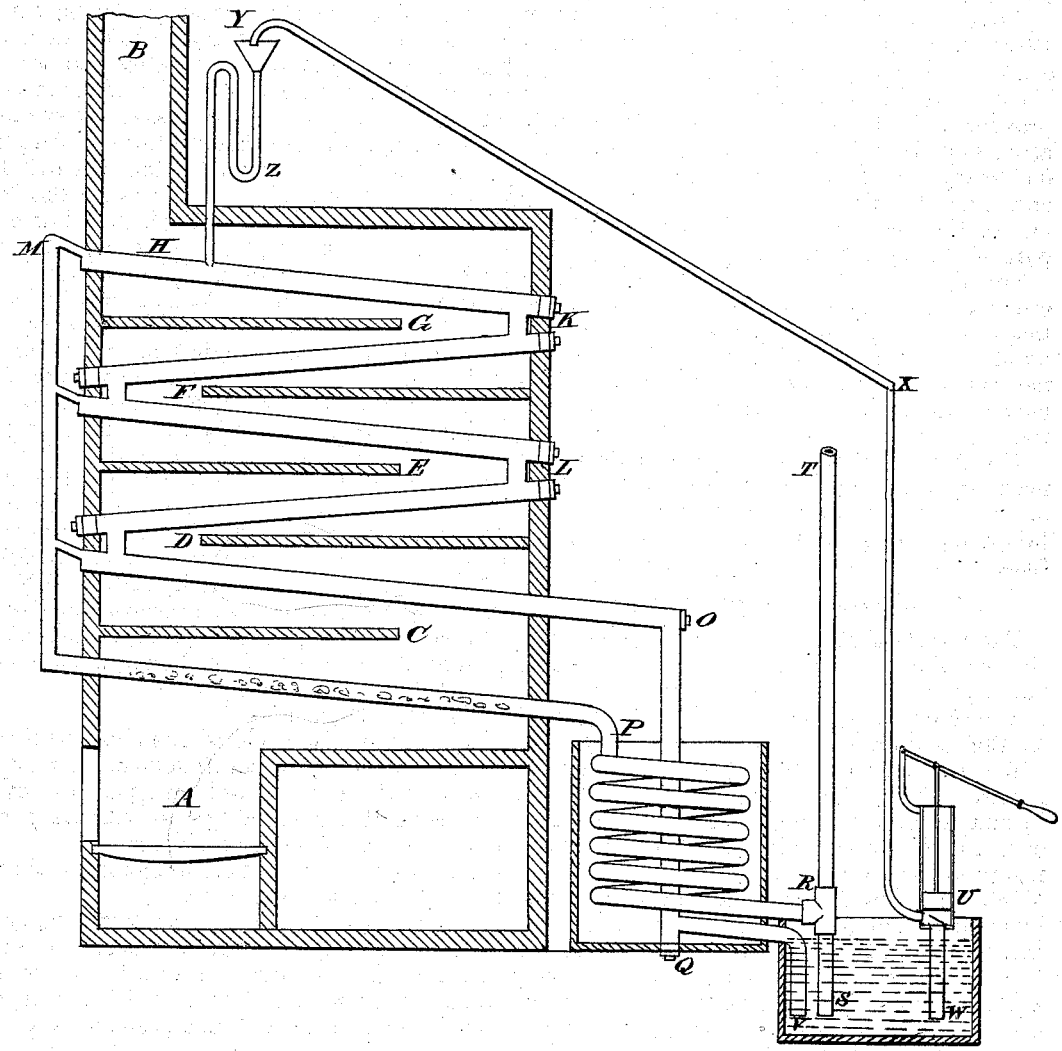

125,633

UNITED STATES PATENT OFFICE.

PETER H. VANDER WEYDE, OF NEW YORK, N. Y.

IMPROVEMENT IN THE MANUFACTURE OF ILLUMINATING GAS.

Specification forming part of Letters Patent No. 125,633, dated April 9, 1872.

SPECIFICATION.

*To all whom it may concern:*

Be it known that I, PETER H. VANDER WEYDE, of the city of New York, in the county of New York, in the State of New York, have invented a new and useful Improvement in the Method of Making Illuminating Gas from Hydrocarbon Liquids; and I do hereby declare that the following is a full and exact description thereof, reference being had to the accompanying drawing making a part of this specification.

The liquid used may be petroleum, either crude or refined—as benzine, gasoline, naphtha, kerosene, &c.—or any other animal or vegetable oil or liquid fat. However, I prefer the natural petroleum, as well for the sake of economy as for the value of the refuse matter obtained.

The nature of my invention consists in a peculiar form of apparatus and in the manner of treating the liquid hydrocarbon so as to obtain a superior illuminator and a valuable refuse.

*Description of Drawing.*

The retorts through which the oil flows consist in a series of tubes combined in a zigzag manner and fixed between two walls in a flue of the same zigzag shape. A is the fire-place; B, the exit for the products of combustion, while the heat goes upward through the channels A, C, D, E, F, G, H, and B. The oil flows in and descends in opposite direction. It is continuously received in the tunnel Y from a reservoir, or may be pumped up from a tank, V W, below, by means of a pump, U, driven by hand or a slight power. The oil flows first through tubes heated to a moderate temperature, and later through such as are heated to a much higher degree. The gases and vapors given off successively pass by proper channels in the vertical tube M N, whence they are conducted through the tube N P, filled with coke or other suitable porous material, and exposed to the fire, so as to be kept at a low red heat, by the agency of which heat those portions which are not permanent gas, but condensable by cold, are changed into the desired condition of non-condensable gas—at least, non-condensable under ordinary circumstances. This gas, escaping at P, is cooled in a condensing-coil, and finally reaches the tube R, from which it ascends to T, and from there may be conducted to the customary gas-holders. Any condensable portions which, perhaps, may be separated in the coil will flow back by the tube N and mingle with the original material from which the gas is being made. The thick oil or tar, remaining from the operation and flowing out at O, is conducted to Q through the cooling-tank, and may be either mixed with the material at S, to be submitted to repeated destructive distillation; or, in case of using crude petroleum, it may be made to pass out at Q, which, in that case, is provided with a proper trap or bend, so as to give no exit to vapors, but only to liquids. This oil will be identical with the heavy lubricating-oils, (in case, namely, the heat applied has not been too intense,) and, after passing through a filter, it has then great value as a lubricator. The ends of the tubes at R, L, O, and N, and also Q, are provided with screw-caps, in order to be able to open them and clean out the tubes, from time to time, during a short interruption of the operation.

What I claim is—

1. The combination of the zigzag tubes, in which the oil in its continuous downward flow is partially decomposed and partially evaporated till the remaining less volatile portion flows out as a tar or lubricator.

2. The arrangement of the zigzag flue through which the draught passes.

3. The passage of the gases and vapors, as evolved through the greatest heat of the same furnace, by passing it through one or more tubes filled with porous material and exposed to the same fire which has produced the evaporation.

In witness whereof I have signed my name.

P. H. VANDER WEYDE.

Witnesses:
PARK BENJAMIN,
WILLARD L. WARD.